United States Patent [19]
Mingledorff

[11] Patent Number: 5,784,211
[45] Date of Patent: Jul. 21, 1998

[54] AUXILIARY REARVIEW MIRROR ASSEMBLY FOR ATTACHMENT TO A SIDE-MOUNTED VEHICLE REARVIEW MIRROR

[76] Inventor: Neil H. Mingledorff, P. O. Box 14145, Savannah, Ga. 31416-1145

[21] Appl. No.: 125,750

[22] Filed: Sep. 24, 1993

[51] Int. Cl.⁶ .............................. G02B 7/182; G02B 5/10
[52] U.S. Cl. .......................... 359/871; 359/850; 359/864
[58] Field of Search ................................. 359/842, 850, 359/864, 871

[56] References Cited

U.S. PATENT DOCUMENTS

| | | | |
|---|---|---|---|
| 3,338,655 | 8/1967 | Young | 359/864 |
| 4,200,359 | 4/1980 | Lawson | 359/850 |
| 4,223,983 | 9/1980 | Bloom | 359/864 |
| 4,311,363 | 1/1982 | Marsalka et al. | 359/864 |
| 4,678,294 | 7/1987 | Van Nostrand | 359/864 |
| 4,834,521 | 5/1989 | Dubs | 359/850 |
| 4,878,743 | 11/1989 | Aikawa et al. | 359/271 |
| 4,929,074 | 5/1990 | Urban | 359/864 |

FOREIGN PATENT DOCUMENTS

| | | | |
|---|---|---|---|
| 443990 | 8/1991 | European Pat. Off. | 359/850 |
| 144240 | 6/1990 | Japan | 359/850 |
| 2250250 | 6/1992 | United Kingdom | 359/850 |
| 2252946 | 8/1992 | United Kingdom | 359/850 |

*Primary Examiner*—Scott J. Sugarman
*Attorney, Agent, or Firm*—Donald A. Kettlestrings

[57] ABSTRACT

A rearview mirror assembly is provided for auxiliary attachment to a conventional side-mounted vehicle rearview mirror. The assembly includes a housing defining a rear surface having adhesive thereon for attaching the assembly to the conventional rearview mirror. The assembly further includes a first flat or convex mirror positioned within the housing in first predetermined relationship with the rear surface and a second convex mirror positioned within the housing in second predetermined relationship with the rear surface. The blind spot of the conventional rearview mirror is substantially eliminated and the viewing range is increased by use of the rearview mirror assembly in combination with the conventional rearview mirror.

17 Claims, 8 Drawing Sheets

AUXILIARY REARVIEW MIRROR ASSEMBLY FOR ATTACHMENT TO A SIDE-MOUNTED VEHICLE REARVIEW MIRROR

BACKGROUND OF THE INVENTION

This invention relates to a rearview mirror assembly and more particularly to an auxiliary rearview mirror assembly for attachment to a conventional flat or convex side-mounted vehicle rearview mirror for significantly eliminating the blind spot and for increasing the viewing range of the side-mounted mirror.

Various types of multiple-mirror arrangements are known for reducing or eliminating the so-called blind spot which exists when using only conventional flat or convex, side-mounted vehicle rearview mirrors. Many of these known multiple-mirror arrangements are configured so that the original side-mounted rearview mirror on the vehicle must be removed and replaced with the multiple-mirror assembly. This often requires that a mechanic or other skilled person remove the existing mirror and replace it with a multiple-mirror assembly. This is an expensive and time-consuming process, and the conventional mirror must often be discarded.

Various types of auxiliary mirror assemblies are known for attachment to conventional flat, side-mounted vehicle rearview mirrors, but these auxiliary attachments have not proved entirely satisfactory because they do not provide the wide viewing range necessary for safety and for significantly eliminating any blind spot.

It is, therefore, an object of the present invention to provide a rearview mirror assembly for enabling quick and easy attachment to a conventional flat or convex side-mounted vehicle rearview mirror.

Another object is to provide a rearview mirror assembly which can be attached to a conventional flat or convex side-mounted vehicle rearview mirror for increasing the viewing range.

A further object of the invention is the provision of a rearview mirror assembly which substantially eliminates the blind spot which exists when using only a conventional flat or convex side-mounted vehicle rearview mirror.

A still further object is to provide a rearview mirror assembly which can be used on a conventional driver's side rearview mirror or on a conventional passenger's side rearview mirror.

Still another object is to provide a rearview mirror assembly which is relatively inexpensive and which can be quickly and easily mounted on a conventional side-mounted vehicle rearview mirror to increase the viewing range of the conventional mirror without requiring replacement of the conventional mirror.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects, the present invention provides a rearview mirror assembly for attachment to a conventional side-mounted vehicle rearview mirror. The assembly comprising a housing defining a rear surface; first means in operative relationship with the rear surface for attaching the assembly to the side-mounted vehicle rearview mirror; a first flat or convex mirror positioned within the housing in first predetermined relationship with the rear surface; and a second convex mirror positioned within the housing in second predetermined relationship with the rear surface.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate examples of preferred embodiments of the invention and, together with the description, serve to explain the principles of the invention.

DESCRIPTION OF THE PREFERRED EMBODIMENTS

With reference now to the drawings, wherein like reference characters designate like or corresponding parts throughout the several views, there is shown in FIGS. 1–4 a first embodiment of a rearview mirror assembly 20 for attachment to a conventional driver's side-mounted vehicle rearview mirror 22. Mirror 22 is typically flat, but mirror 22 can be convex.

Mirror assembly 20 is comprised of a housing 24 which defines a rear surface 26. First means 28 are provided in operative relationship with rear surface 26 for attaching assembly 20 to the mirrored surface of conventional side-mounted vehicle rearview mirror 22. First means 28 is preferably an adhesive, and a conventional foam tape coated on both sides with adhesive can be used.

Assembly 20 further comprises a first flat or convex mirror 32 positioned within housing 24 in first predetermined relationship with rear surface 26. Assembly 20 further comprises a second convex mirror 34 positioned within housing 24 in second predetermined relationship with rear surface 26.

Rear surface 26 is preferably flat, but rear surface 26 can be concave to conform to the curve of mirrored surface 30 if conventional factory-installed driver's side-mounted mirror 22 is convex.

In one structural configuration of the assembly embodiment shown in FIGS. 1–4, first mirror 32 is flat and second mirror 34 is convex. First flat mirror 32 preferably defines an angle of from two degrees to three degrees with respect to rear surface 26. The preferred angle between first flat mirror 32 and rear surface 26 is two and one-half degrees for providing the optimum viewing range.

Second convex mirror 34 in assembly 20 defines first and second ends 36, 36', and an imaginary chord (not shown) which passes through ends 36, 36' preferably defines an angle of from fourteen degrees to sixteen degrees with respect to rear surface 26. The angle defined by the imaginary chord passing through ends 36, 36' is preferably fifteen degrees for providing the optimal viewing range. Second convex mirror 34 preferably defines a surface of substantially seven and one-half inches in radius.

First mirror 32 may be positioned above second mirror 34, as illustrated, or first mirror 32 can be positioned below second mirror 34.

An alternative structure of first embodiment 20 is identical to the structure previously described with the exception that first mirror 32 is convex instead of flat. In this configuration convex mirror 32 defines first and second ends 38, 38' and an imaginary chord which passes through ends 38, 38' preferably defines an angle of from two degrees to three degrees with respect to rear surface 26. The preferred angle defined by the imaginary chord with respect to rear surface 26 is two and one-half degrees for providing an optimal viewing range. Convex mirror 32 preferably defines a surface of from sixteen inches to eighteen inches in radius, and the preferred radius is fifteen degrees to provide an optimal viewing range.

Convex mirror 32 is preferably positioned above convex mirror 34 in this configuration, but convex mirror 32 can be positioned below convex mirror 34.

FIGS. 5–8 illustrate a second embodiment of rearview mirror assembly 20' for attachment to a conventional passenger's side-mounted vehicle mirror 22'. Mirror 22' is typically convex, but mirror 22' can be flat. Rearview mirror assembly 20' is identical in construction to assembly 20, as previously described, but mirror assembly 20' is configured to be mounted on passenger's side rearview mirror 22'.

Mirror assembly 20, with either a flat or convex mirror 32, is designed to supplement and enhance the viewing range provided by conventional driver's side-mounted rearview mirror 22. Assembly 20 is preferably installed at the lower left corner of conventional side-mounted mirror 22. See FIG. 4. Thicker edge 25 of housing 24 is positioned nearer to the vehicle (not shown) than is thin edge 27. Conventional mirror 22 can be flat or convex. If mirror 22 is convex, curved surface 30 of mirror 22 is typically defined by at least a sixteen inch radius. The width of assembly 20 is such that a foam adhesive tape 28 on flat rear surface 26 will mold itself to the slight curve of surface 30 to enable assembly 20 to be tightly held to surface 30. Alternatively, rear surface 26 can be manufactured in concave configuration to fit standard convex surface 30.

Figure 1:
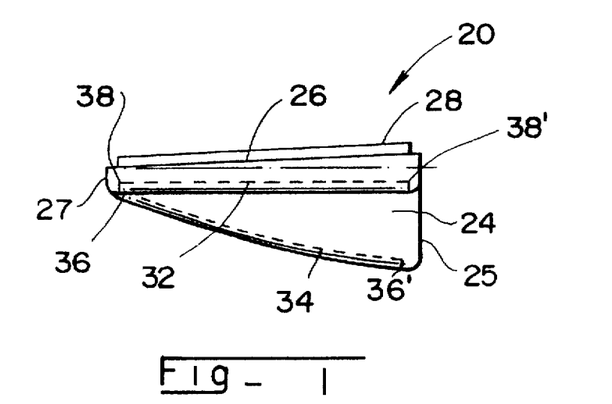
FIG. 1 is a top plan view of a left or driver's side embodiment of the invention.
Figure 2:
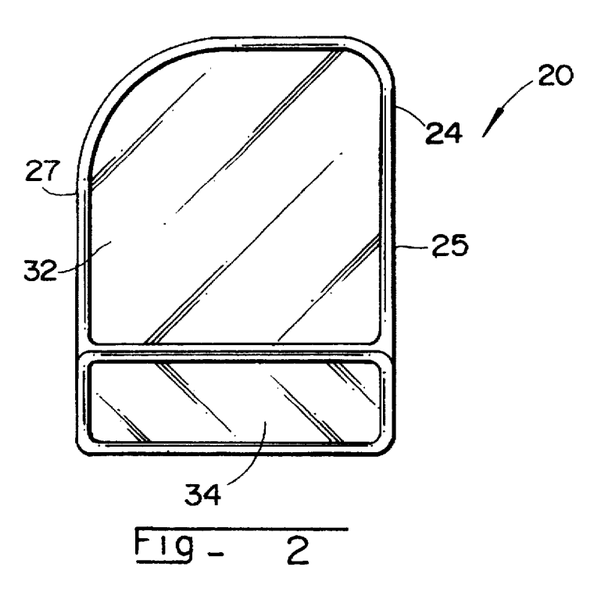
FIG. 2 is a front elevation view of the mirror embodiment shown in FIG. 1.
Figure 3:
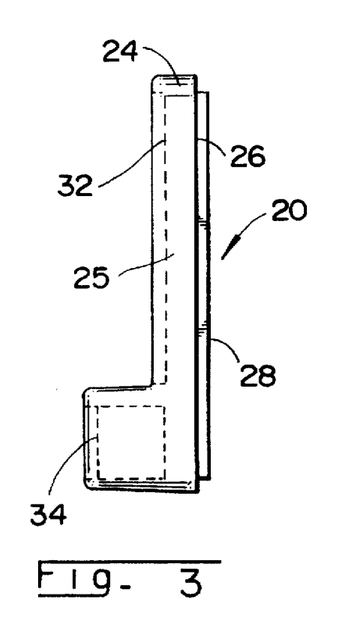
FIG. 3 is an end elevation view of the invention embodiment illustrated in FIG. 1.
Figure 4:
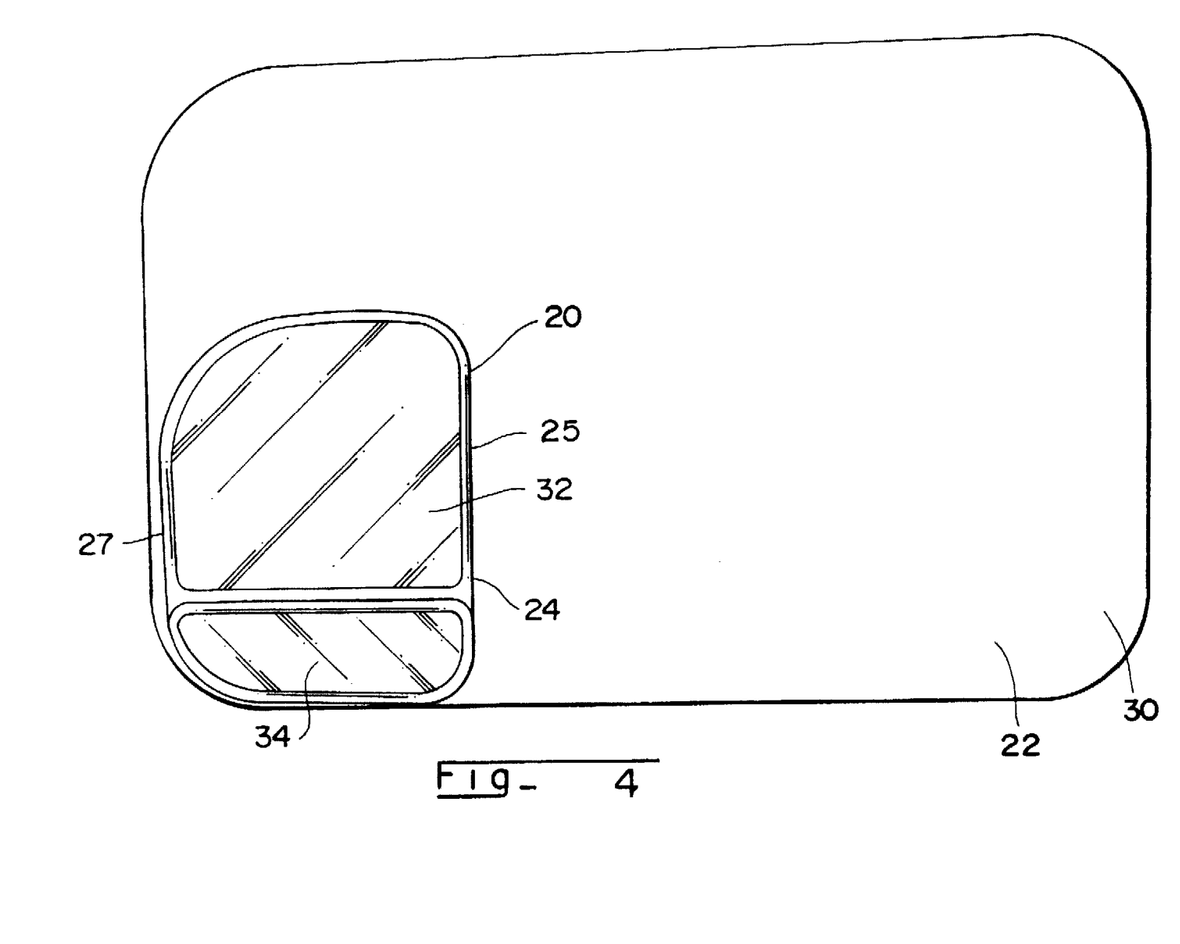
FIG. 4 is a front elevation view showing the invention embodiment of FIG. 1 mounted onto a conventional left side-mounted vehicle rearview mirror.
Figure 5:
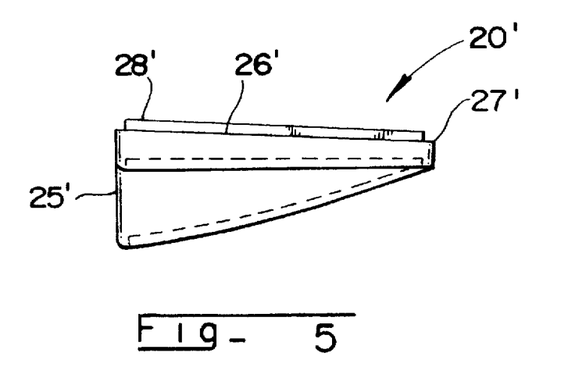
FIG. 5 is a top plan view of a right or passenger's side embodiment of the invention.
Figure 6:
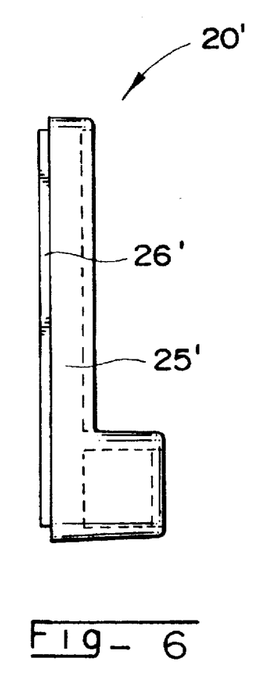
FIG. 6 is an end elevation view of the invention embodiment shown in FIG. 5.
Figure 7:
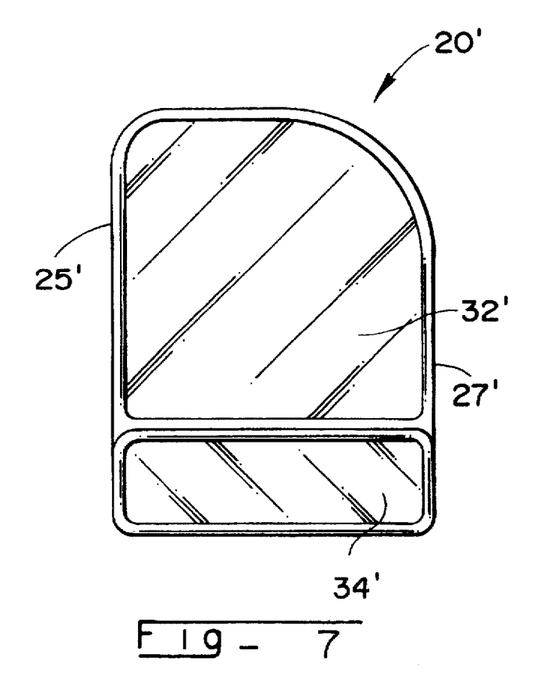
FIG. 7 is a front elevation view of the mirror embodiment shown in FIG. 5.
Figure 8:
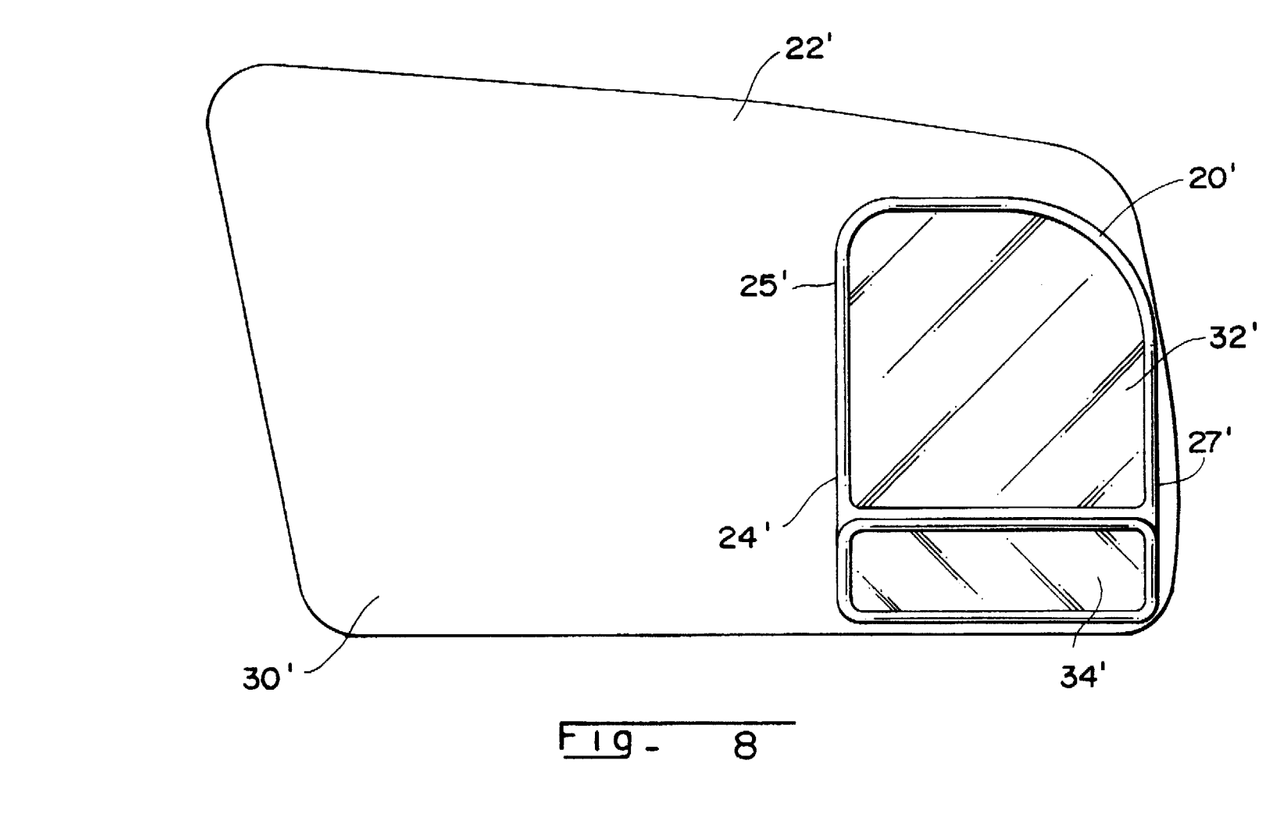
FIG. 8 is a front elevation view showing the embodiment of FIG. 5 mounted onto a conventional right side-mounted vehicle rearview mirror.

FIG. 8 illustrates rearview mirror assembly 20' mounted onto conventional passenger side rearview mirror 22'. Assembly 20' is preferably mounted to surface 30' of mirror 22' at the lower right corner of surface 30', as shown in FIG. 8. Thicker edge 25' of housing 24' is positioned nearer to the vehicle (not shown) than is thin edge 27'. Rear surface 26' is preferably flat but surface 26' can be concave to conform to convex surface 30' of mirror 22' if mirror 22' is convex. The use of foam tape 28' enables assembly 20' to be firmly attached to surface 30' even when surface 30' is convex and when surface 26' is flat.

When passenger side conventional mirror 22' is convex, it is preferable that mirror 32' in assembly 20' also be convex rather than flat. The image seen in convex mirror 22' is small and the image seen in flat mirror 32' is large in relationship to the image seen in conventional mirror 22'. This difference in sizes of the images makes it preferable that mirror 32' be convex if assembly 20' is mounted on a convex mirror 22'.

However, tests have shown that the image viewed by a driver only in conventional convex passenger's side mirror 22' may falsely indicate to the driver that his vehicle has safely passed a vehicle to the right side of his vehicle when, in fact, that may not be the case. If the driver relies only on the image seen in conventional convex mirror 22', he may turn back into his original lane prematurely and before his vehicle has safely and completely passed a vehicle to his right side.

By using a flat mirror 32' in assembly 20', which assembly 20' is mounted on conventional passenger's side mirror 22', the image seen by the driver in flat mirror 32' will accurately show the driver when his vehicle has safely and completely passed another vehicle and when it is safe to turn his vehicle to the right and back into his original lane after passing another vehicle. This is an important advantage provided by assembly 20' when mirror 32' is flat and when assembly 20' is mounted on conventional convex passenger's side mirror 22'.

Figure 9:
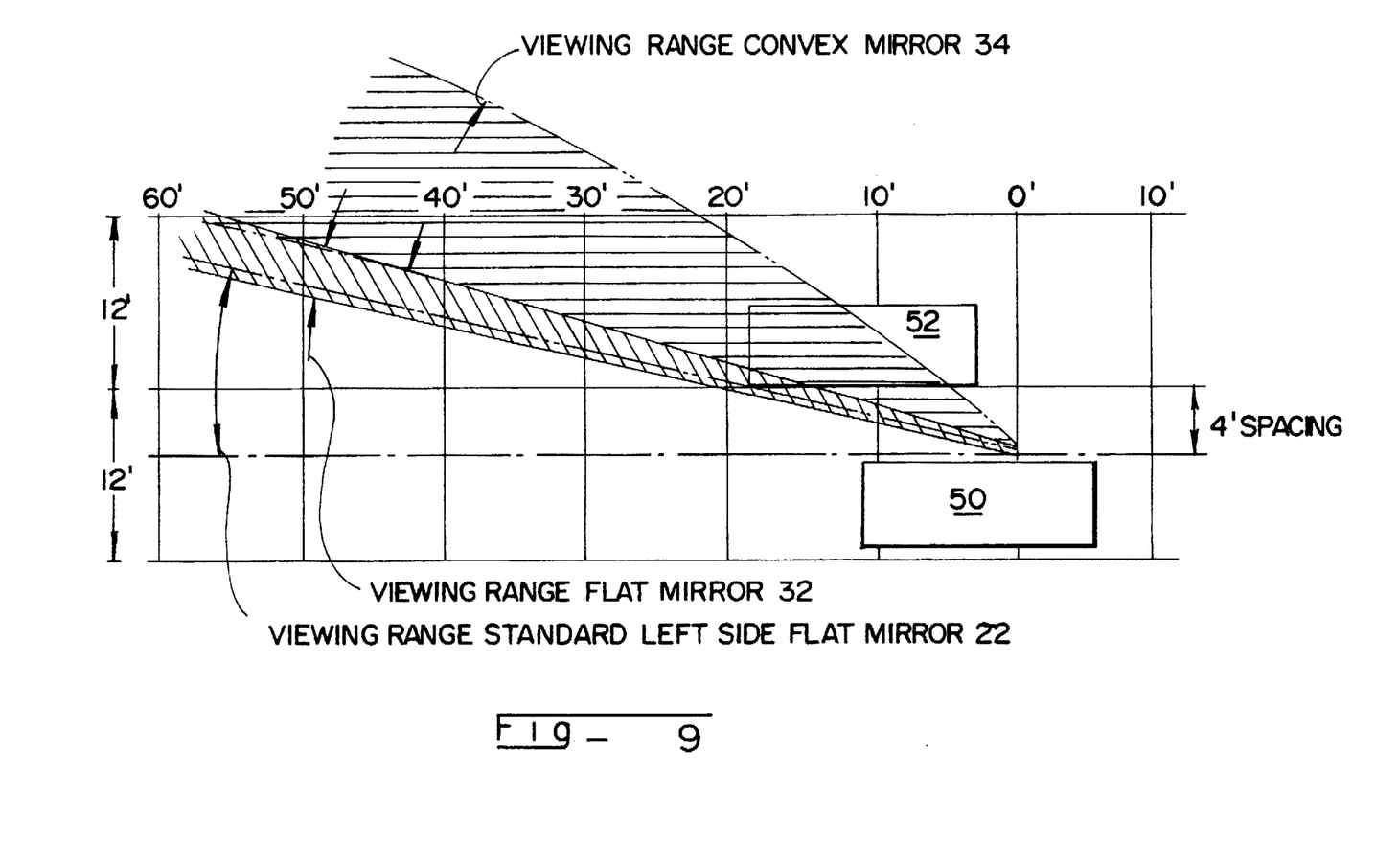
FIG. 9 is a diagrammatic illustration of the viewing ranges of the mirror embodiment shown in FIG. 1 when the mirror embodiment of FIG. 1 is mounted on a conventional flat left side-mounted vehicle rearview mirror 30 (FIG. 4), when mirror 32 is flat and when mirror 34 is convex.

The viewing ranges provided by mirror assemblies 20, 20', when used in combination with and as a supplement to conventional side-mounted rearview mirrors 22, 22', are significantly enhanced to substantially eliminate blind spots. FIG. 9 illustrates the enhanced viewing range when mirror assembly 20 is mounted on vehicle 50, when assembly 20 is provided with a flat mirror 32 and when assembly 20 is mounted on a conventional flat driver's side rearview mirror 22. Vehicle 52 is shown within the viewing range of assembly 20.

Figure 10:
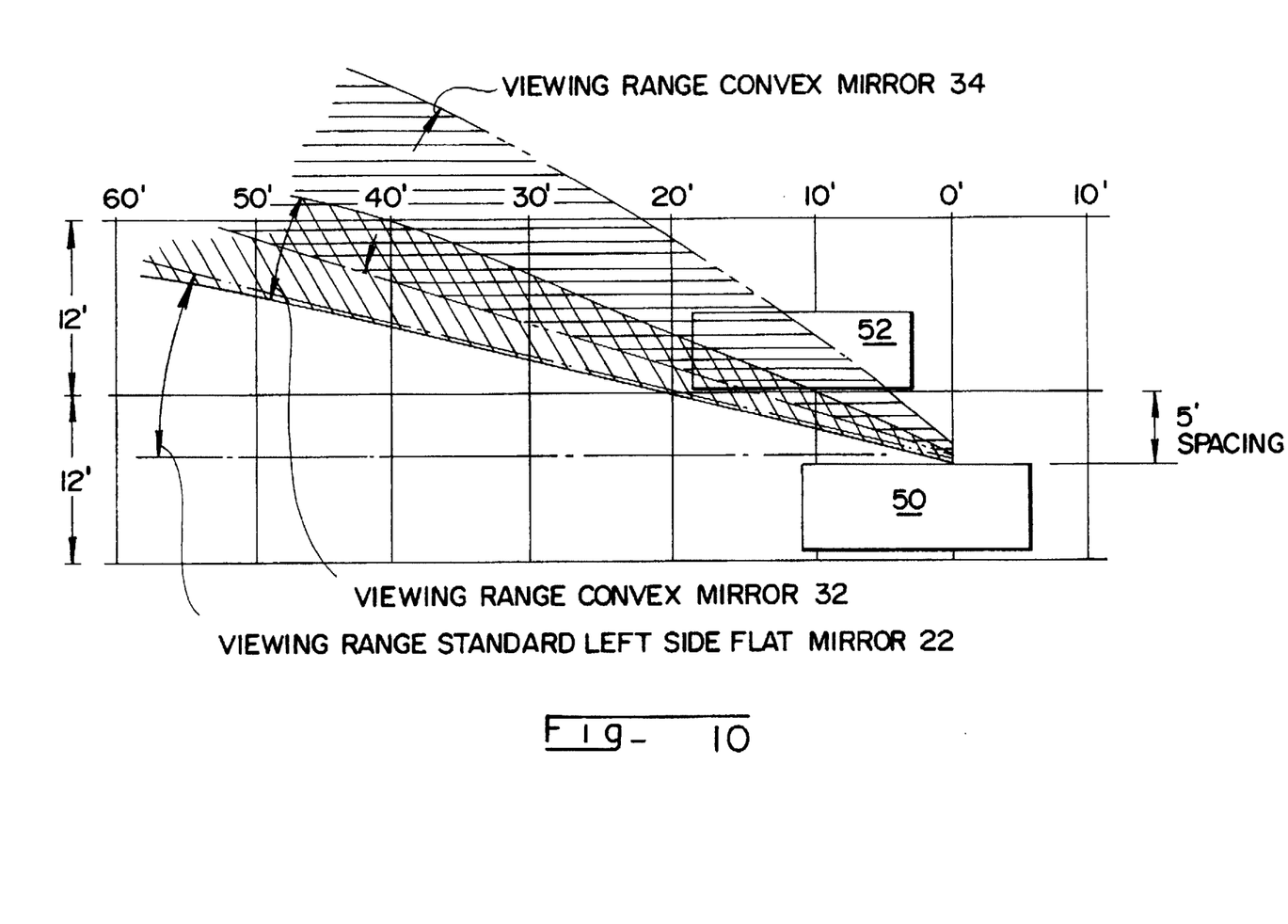
FIG. 10 is a diagrammatic illustration of the viewing ranges of the mirror embodiment shown in FIG. 1 when the mirror embodiment of FIG. 1 is mounted on a conventional flat left side-mounted vehicle rearview mirror 30 (FIG. 4), when mirror 32 is convex and when mirror 34 is convex.

FIG. 10 shows the enhanced viewing range when mirror assembly 20 is mounted on vehicle 50, when assembly 20 is provided with a convex mirror 32 and when assembly 20 is mounted on a standard flat driver's side rearview mirror 22. Vehicle 52 is shown within the viewing range of assembly 20.

Figure 11:
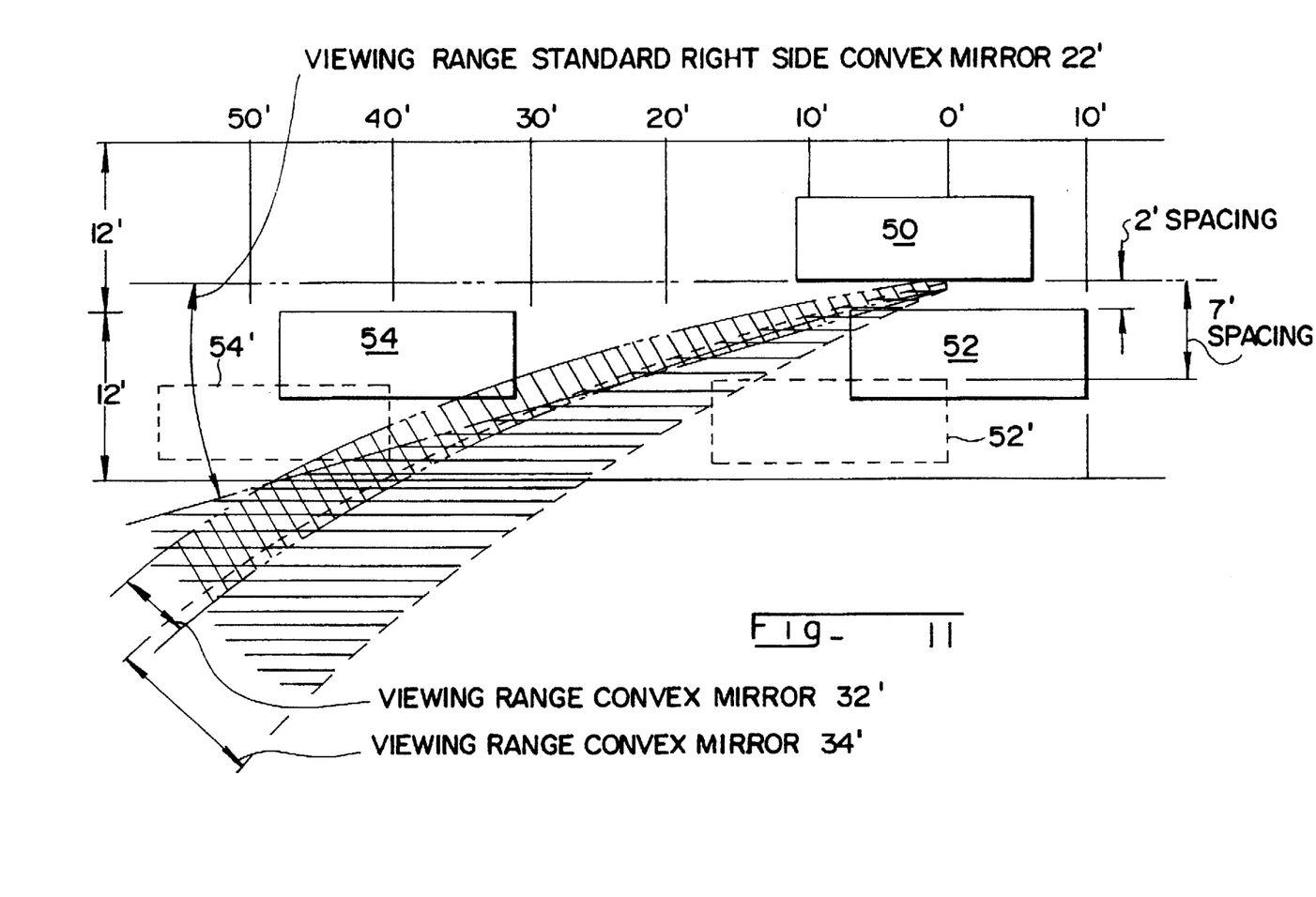
FIG. 11 is a diagrammatic illustration of the viewing ranges of the mirror embodiment shown in FIG. 5 when the mirror embodiment of FIG. 5 is mounted on a conventional convex right side-mounted vehicle rearview mirror 30' (FIG. 8), when mirror 32' is convex and when mirror 34' is convex.

FIG. 11 shows the enhanced viewing range when mirror assembly 20' is mounted on vehicle 50, when assembly 20' is provided with a convex mirror 32' and when assembly 20' is mounted on a conventional passenger's side convex mirror 22'. Vehicles 52, 52', 54 and 54' are shown within the viewing range of assembly 20'.

Figure 12:
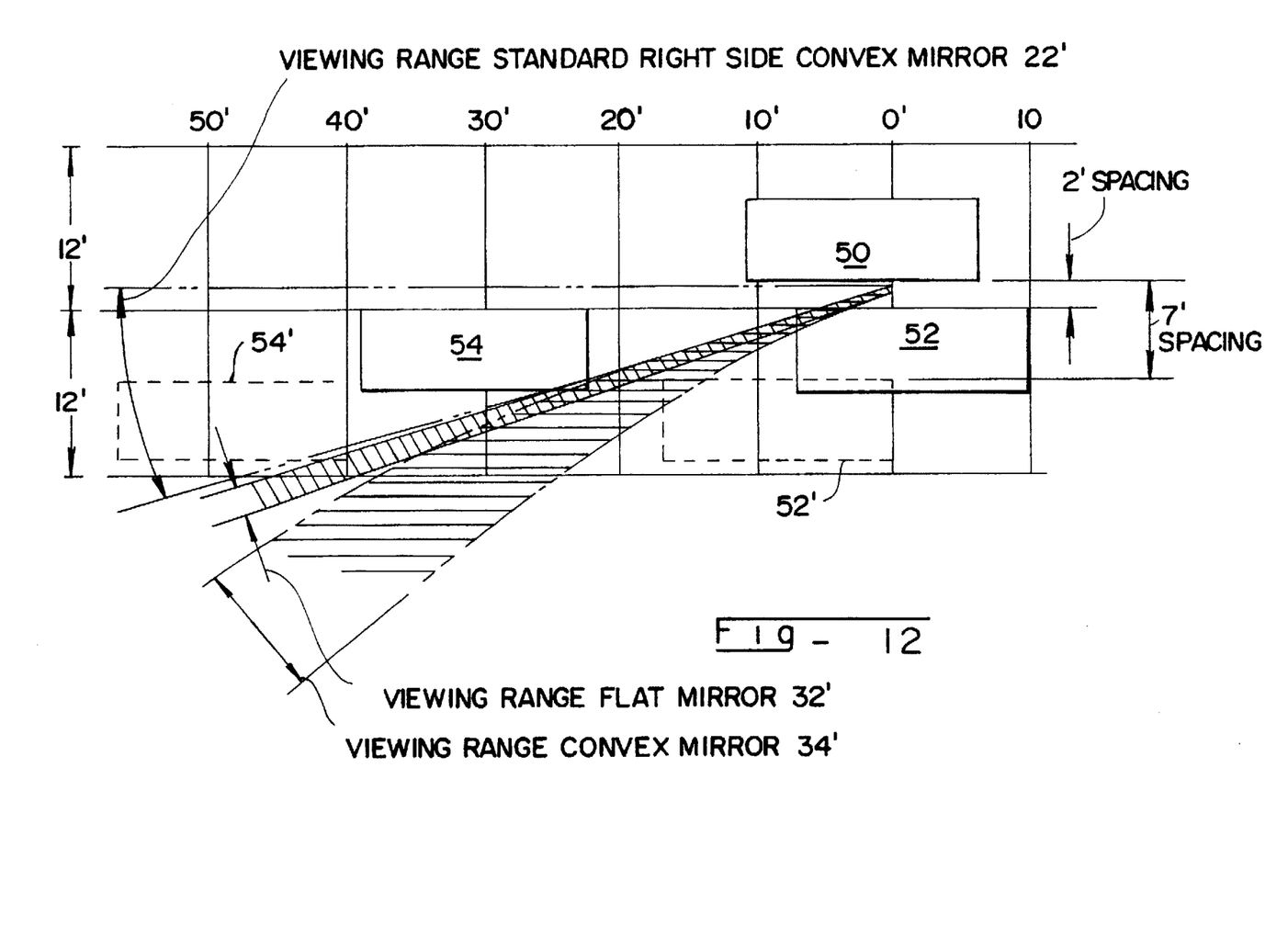
FIG. 12 is a diagrammatic illustration of the viewing ranges of the mirror embodiment shown in FIG. 5 when the mirror embodiment shown in FIG. 5 is mounted on a conventional convex right side-mounted vehicle rearview mirror 30' (FIG. 8), when mirror 32' is flat and when mirror 34' is convex.

FIG. 12 shows the enhanced viewing range when mirror assembly 20' is mounted on vehicle 50, when assembly 20' has a flat mirror 32' and when assembly 20' is mounted on a conventional convex passenger side rearview mirror 22'. Vehicles 52, 52', 54 and 54' are shown within the viewing range of assembly 20'.

Mirror assemblies 20, 20' provide improved viewing range and substantially eliminate blind spots when mounted on conventional flat or convex side-mounted vehicle rearview mirrors. Mirror assemblies 20, 20' provide improved viewing ranges when compared to the viewing ranges provided only by conventional small stick-on convex mirrors. When flat mirror 32 in assembly 20 is used in cooperation with a flat conventional mirror 22, the image seen in flat mirror 32 is the same size as the image seen in conventional mirror 22. This is an improvement over the use of known small convex stick-on mirrors which are mounted on conventional flat mirrors because the image seen in the small stick-on mirrors is much smaller than the image seen in the conventional flat mirror to which it is mounted. The smaller image of the known stick-on convex mirrors gives the viewer a false impression of the distance of the object being viewed.

By use of mirrors 34, 34' in mirror assemblies 20, 20', an extreme lane width blind spot can be viewed. Mirrors 34, 34' enable viewing of objects farther forward with respect to the vehicle on which the mirrors are mounted than do mirrors 32, 32' alone. Mirrors 34, 34' also enable the driver of a vehicle to be able to see another vehicle beside him when he is backing up. The driver, without having to turn his head, can see most of the side of a vehicle adjacent to the viewer's vehicle by use of mirrors 34, 34'.

The invention in its broader aspects is not limited to the specific details shown and described, and departures may be made from such details without departing from the principles of the invention and without sacrificing its chief advantages.

What is claimed is:

1. A rearview mirror assembly for attachment to a side-mounted vehicle rearview mirror, said assembly comprising:
   a housing defining a substantially flat rear surface;
   first means in operative relationship with said rear surface for attaching said assembly to said rearview mirror;
   a first substantially flat mirror positioned within said housing in first predetermined relationship with said rear surface; and
   a second convex mirror positioned within said housing in second predetermined relationship with said rear surface.

2. A rearview mirror assembly as in claim 1 wherein said first mirror defines an angle of from two degrees to three degrees with respect to said rear surface.

3. A rearview mirror assembly as in claim 2 wherein said second convex mirror defines first and second ends and wherein an imaginary chord which passes through said ends defines an angle of from fourteen degrees to sixteen degrees with respect to said rear surface.

4. A rearview mirror assembly as in claim 3 wherein said second convex mirror defines a surface of substantially seven and one-half inches in radius.

5. A rearview mirror assembly as in claim 4 wherein said first means include adhesive.

6. A rearview mirror assembly as in claim 5 wherein said first mirror is positioned above said second mirror.

7. A rearview mirror assembly as in claim 5 in combination with a side-mounted vehicle rearview mirror wherein said side-mounted vehicle rearview mirror is substantially flat.

8. A rearview mirror assembly as in claim 5 in combination with a side-mounted vehicle rearview mirror wherein said side-mounted vehicle rearview mirror is convex.

9. A rearview mirror assembly for attachment to a side-mounted vehicle rearview mirror, said assembly comprising:
   a housing defining a rear surface;
   first means in operative relationship with said rear surface for attaching said assembly to said rearview mirror;
   a first convex mirror positioned within said housing in first predetermined relationship with said rear surface; and
   a second convex mirror positioned within said housing in second predetermined relationship with said rear surface.

10. A rearview mirror assembly as in claim 9 wherein said first convex mirror defines first and second ends and wherein an imaginary chord which passes through said ends defines an angle of from two degrees to three degrees with respect to said rear surface.

11. A rearview mirror assembly as in claim 10 wherein said first convex mirror defines a surface having a radius of curvature of from sixteen inches to eighteen inches.

12. A rearview mirror assembly as in claim 11 wherein said second convex mirror defines first and second ends and wherein an imaginary chord which passes through said ends of said second convex mirror defines an angle of from fourteen degrees to sixteen degrees with respect to said rear surface.

13. A rearview mirror assembly as in claim 12 wherein said second convex mirror defines a surface having a radius of curvature of substantially seven and one-half inches.

14. A rearview mirror assembly as in claim 13 wherein said first means include adhesive.

15. A rearview mirror assembly as in claim 14 wherein said first mirror is positioned above said second mirror.

16. A rearview mirror assembly as in claim 14 in combination with a side-mounted vehicle rearview mirror wherein said side-mounted vehicle rearview mirror is substantially flat.

17. A rearview mirror assembly as in claim 14 in combination with a side-mounted vehicle rearview mirror wherein said side-mounted vehicle rearview mirror is convex.

\* \* \* \* \*